United States Patent [19]

Niskin

[11] Patent Number: 4,545,243

[45] Date of Patent: Oct. 8, 1985

[54] NONROTATING CURRENT METER HOUSING

[76] Inventor: Shale J. Niskin, 3415 Chase Ave., Miami Beach, Fla. 33140

[21] Appl. No.: 572,800

[22] Filed: Jan. 23, 1984

[51] Int. Cl.$^4$ ............................................. G01W 1/00
[52] U.S. Cl. ...................................... 73/170 A; 73/189
[58] Field of Search .............. 73/170 A, 186, 861.74, 73/188, 170 R, 185, 187; 416/85, 174

[56] References Cited

U.S. PATENT DOCUMENTS

| | | | |
|---|---|---|---|
| 577,501 | 2/1897 | Alexander | 73/185 |
| 868,798 | 10/1907 | McLaughlin | 416/85 |
| 1,191,764 | 7/1916 | Cornelis | 73/185 |
| 1,852,414 | 4/1932 | Hoff | 73/185 |
| 4,091,666 | 5/1978 | Niskin | 73/170 A |
| 4,307,605 | 12/1981 | Niskin | 73/170 A |

*Primary Examiner*—Charles Frankfort
*Assistant Examiner*—Thomas B. Will
*Attorney, Agent, or Firm*—William A. Newton

[57] ABSTRACT

A current meter for measuring the velocity and direction of the water current comprising a housing; a support cable rigidly secured to the housing and appendages rotatably mounted at opposed ends of the housing and formed of a neutrally buoyant material. The appendages are formed from a single piece of the neutrally buoyant material which is attached to a pair of sleeves which are rotatably mounted to the exterior of the housing by a pair of ballbearing races.

4 Claims, 5 Drawing Figures

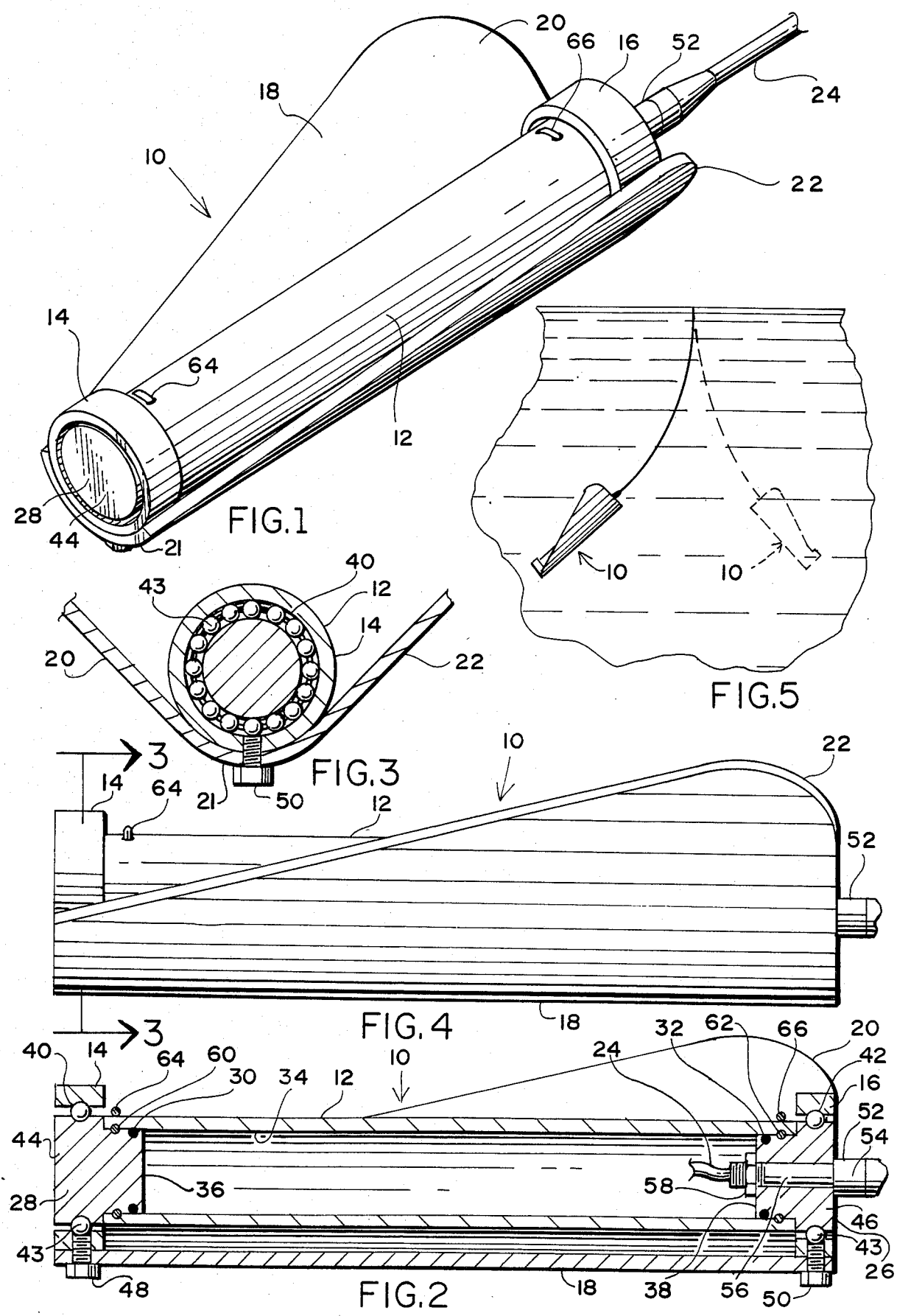

NONROTATING CURRENT METER HOUSING

BACKGROUND OF THE INVENTION

1. Field of the Invention

This invention relates to apparatus for measuring water flow and more particularly is directed toward the housing of the water meter.

2. Description of the Prior Art

Current or water flow meters are used in the prior art to obtain reading of current velocity and direction of flow, using, for example, an inclinometer contained therein. In the prior art, as shown in U.S. Pat. Nos. 4,091,666 and 4,307,605, the housing, which is anchored by a cable, swings into and lies in the same plane as the current flow, at a vertical angle as determined by the force of the onrushing water current. The current meter fins are connected through a universal joint or swivelled connector to the housing of the current meter, allowing a pair of fins and housing to rotate, so that the current flow exerts an equal force on the two fins. The fins prevent the housing from fluttering from side to side as would occur if no fins were applied to the housing. The rotation of the housing is primarily a function of the fins swinging into a new direction of the current. Despite the improvements of these designs, an electrical connection had to be established and maintained between the connecting electrical cable from an external recording device and the rotating current meter housing via the universal joint; leading to an unreliable and corrosion susceptible electrical path.

SUMMARY OF THE INVENTION

In the present invention, a current meter is provided wherein the wings or fins are rotatably mounted on opposed ends of the current meter by a pair of ball bearing races with the cable being directly and rigidly secured to the end of the non-rotating housing; thereby eliminating the unreliable electrical connection of the universal joint of the prior art.

The fins are made from a neutrally buoyant material having a density substantially the same as water so as to eliminate any mass differential. This makes the current meter responsive to low velocity current effects, in that it provides sufficient drag surfaces, with no mass differential so as not to create a load on the ball bearings.

BRIEF DESCRIPTION OF THE DRAWINGS

Further objects and advantages of the present invention will become apparent as the following description proceeds, taken in conjunction with the accompanying drawings in which:

FIG. 1 is a perspective view of the current meter of the invention.

FIG. 2 is a cross-sectional view of the current meter.

FIG. 3 is a cross-sectional view of the current meter taken along section line 3—3 in FIG. 4.

FIG. 4 is a side view of the current meter.

FIG. 5 shows the current meter in use.

DESCRIPTION OF THE PREFERRED EMBODIMENT

FIG. 1 shows a current meter 10, generally indicated by numeral 10, having a cylindrical housing 12. A pair of rotatably mounted sleeves 14 and 16 are positioned at opposed ends of the housing 12. Rigidly attached to the sleeves 14 and 16 is an appendage means in the form of fins 18 having a curvilinear middle portion 21 and a pair of angled, straight wing portions 20 and 22 protruding outward from the housing 12. The curvilinear middle portion conforms to the cylindrical configuration of the housing 12. A cable 24 is rigidly secured to one end of the housing 12. The cable 24 provides both the means for suspension and an electrical cable to provide electrical coupling between the conventional instruments (not shown) inside the housing and a conventional recording device (not shown) at the other end of the cable. The conventional instruments can take numerous forms, such as those illustrated in U.S. Pat. Nos. 4,091,666 and 3,372,585, both to Niskin.

Referring to the cross sectional view of FIG. 2, a pair of caps 26 and 28 are mounted in water sealed relationship on opposed ends of the housing 12 by a pair of rubber gaskets 30 and 32, respectively, so as to provide a water tight compartment for the instruments inside. The gaskets fit in corresponding mirror image, circular grooves formed on the interior wall 34 of the housing 12 and inward extending end portions 36 and 38 of the caps 28 and 30, respectively. A pair of ball bearing races 40 and 42, having ball bearings 43, rotatably mount the sleeves 14 and 16 to the outer end portions 44 and 46 of the caps 28 and 30, respectively. A pair of bolts 48 and 50 securely attach the fin 18 to the sleeves 14 and 16. The rotatable mounting of the fin via the sleeves and race bearings is shown in more detail in the cross sectional view of FIG. 3. Referring back to FIG. 2, the cable 24 is rigidly secured in non-rotating relationship to the cap 26 by a mount 52 which extends through the cap 26. FIG. 4 shows the side of the current meter 10.

The fin is made from a single piece of material, such material being a neutrally buoyant material having a density substantially the same as water so as to eliminate any mass differential. This makes the meter response to low velocity current effects, in that it provides sufficient drag surfaces, with no mass differential so as not to create a load on the bearings. An illustrative example of the material is polyethylene or ABS.

In operation, the support cable 24 will be anchored above the surface at its end remote to the current meter housing, or more commonly to standoff framework which is attached to an anchor line, such as shown in U.S. Pat. Nos. 4,091,666 and 4,307,605. The current meter is shown in use in FIG. 5, where the angle of the meter relative to the vertical allows for the measurement of the current. The fins decrease the orbital and sideways swinging of the housing. Hence, with a change in current direction, the housing pivots downstream and also the fins rotate around the longitudinal axis of the housing.

The mount 52 is made up of a rubber boot 54 and a metal tube 56 which extends through the cap 26 so as to allow a nut 58 to secure the mount 52 to the cap 26. The cable 24 extends to the tube 56 and is electrically coupled to the instruments (not shown).

A pair of plastic monofilament members 60 and 62 slide into apertures in the housing which interconnect with mating annular grooves formed in the housing and caps. Ends 64 and 66 of the monofilament members are shown extending out from the housing. The filaments keep the caps secured in said housing until removed.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. A current meter for use in a body of water, comprising:

said current meter being of the type wherein the angle of said current meter relative to the vertical allows for measurement of water currents in the body of water, a housing, a support cable rigidly secured in non-rotating relationship to an end of said housing, a pair of sleeves rotatably mounted to opposed ends of said housing and exteriorly disposed to said housing;

said sleeves are rotatably mounted at opposed exterior end portions of said housing by a pair of ballbearing races, appendage means having a pair of wings, for stabilizing said housing in the water currents, rigidly attached to said sleeves and disposed to extend outward from said housing, whereby the water currents in the body of water cause said appendage means to rotate around the relatively stable said housing and thus cause the current meter to be angularly displaced from the vertical.

2. The current meter of claim 1, wherein said pair of wings are formed of a neutrally buoyant material having a density substantially the same as water; whereby said wings provide sufficient drag surfaces to cause said water meter to respond to low water current effects while provding no mass differential to create a load on said ballbearing races.

3. The current meter of claim 2, wherein said appendages means comprises a single integral piece.

4. The current meter of claim 3, wherein said housing has a substantially cylindrical configuration and said appendage means has a curvilinear middle portion which is integrally formed with and disposed to join said pair of wings, said curvilinear middle portion having a cross section which is dimensioned and configured to surround a portion of the exterior of said cylindrical housing, said pair of wings extending outward from said curvilinear middle portion so that said appendage means has a cross section with a single curved portion.

* * * * *